(12) United States Patent
Wataya

(10) Patent No.: US 11,912,583 B2
(45) Date of Patent: Feb. 27, 2024

(54) SLURRY WITH RARE EARTH OXIDE PARTICLES

(71) Applicant: Shin-Etsu Chemical Co., Ltd., Tokyo (JP)

(72) Inventor: Kazuhiro Wataya, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/521,129

(22) Filed: Nov. 8, 2021

(65) Prior Publication Data

US 2022/0055913 A1 Feb. 24, 2022

Related U.S. Application Data

(62) Division of application No. 16/552,097, filed on Aug. 27, 2019, now Pat. No. 11,292,726.

(30) Foreign Application Priority Data

Aug. 31, 2018 (JP) .................................. 2018-162406

(51) Int. Cl.
| | | |
|---|---|---|
| *C01F 17/10* | (2020.01) | |
| *C01F 17/206* | (2020.01) | |
| *C01F 17/218* | (2020.01) | |
| *C01F 17/224* | (2020.01) | |
| *C01F 17/229* | (2020.01) | |
| *C01F 17/235* | (2020.01) | |
| *C01F 17/241* | (2020.01) | |

(52) U.S. Cl.
CPC ............ *C01F 17/10* (2020.01); *C01F 17/206* (2020.01); *C01F 17/218* (2020.01); *C01F 17/224* (2020.01); *C01F 17/229* (2020.01); *C01F 17/235* (2020.01); *C01F 17/241* (2020.01); *C01P 2004/51* (2013.01)

(58) Field of Classification Search
CPC ........ C01F 17/206–241; C09K 3/1454; C09K 3/1463; C09K 3/1472
See application file for complete search history.

(56) References Cited

U.S. PATENT DOCUMENTS

| 6,596,194 B1 | 7/2003 | Dobson et al. |
| 2004/0244675 A1 | 12/2004 | Kishimoto et al. |

FOREIGN PATENT DOCUMENTS

| JP | H9-255331 A | 9/1997 |
| JP | 2000-44234 A | 2/2000 |
| JP | 2000-239019 A | 9/2000 |

(Continued)

OTHER PUBLICATIONS

Office Action dated Mar. 2, 2021, issued in counterpart JP Application No. JP 2018-162406, with English translation (6 pages).

*Primary Examiner* — Wayne A Langel
(74) *Attorney, Agent, or Firm* — WHDA, LLP

(57) ABSTRACT

A slurry of a dispersion medium and rare earth oxide particles. The particles having a volume basis median particle size D50 of up to 50 nm. The rare earth oxide particles having a dispersity index S of up to 1, the dispersity index S being determined according to the formula (1):

$$(D90-D10)/D50 \qquad (1)$$

wherein D10, D50 and D90 are cumulative 10%, 50% and 90% diameters in volume basis particle size distribution, respectively.

14 Claims, 3 Drawing Sheets

(56) References Cited

FOREIGN PATENT DOCUMENTS

| | | | |
|---|---|---|---|
| JP | 2002-507630 | A | 3/2002 |
| JP | 2003-206475 | A | 7/2003 |
| JP | 2007-126349 | A | 5/2007 |
| JP | 2011-116622 | A | 6/2011 |
| JP | 2016-204168 | A | 12/2016 |
| WO | WO 2002/067309 | A1 * | 6/2004 |

* cited by examiner

SLURRY WITH RARE EARTH OXIDE PARTICLES

CROSS-REFERENCE TO RELATED APPLICATIONS

This application is a Division of U.S. patent application Ser. No. 16/552,097, filed Aug. 27, 2019, which claims priority under 35 U.S.C. § 119(a) to Japanese Patent Application No. 2018-162406 filed in Japan on Aug. 31, 2018, the entire contents of each of which are hereby incorporated by reference.

TECHNICAL FIELD

This invention relates to a method for preparing rare earth compound particles, which is useful for raw materials of ceramics and additives, rare earth oxide particles suitably prepared by the method, and a slurry containing the rare earth oxide particles.

BACKGROUND ART

Rare earth compounds are industrially key materials. Among them, fine particles of a rare earth compound assume an important part for a base material or an additive of ceramics or electric parts. In particularly, in case where, a rare earth compound is used as an additive for ceramics or electric parts, generally, it is required that the rare earth compound has high dispersibility to a base material. Therefore, fine particles of a rare earth compound are recently developed in progress. For example, Patent Document 1 discloses a method of preparing a rare earth compound having a comparatively high specific surface area. However, in connection with an additive for ceramics or electric parts, recently, a rare earth compound having a smaller size is increasingly required to object further improvement of characteristics or reduction of sintering temperature.

Citation List

Patent Document 1: JP-A 2000-44234
Patent Document 2: JP-A 2000-239019

DISCLOSURE OF INVENTION

A method for precipitating metal ions to a precipitate with carbonate ions and ammonium ions generated in hydrolysis of urea by heating an aqueous solution containing urea, so-called urea method, is known for a preparation method of a metal compound. The urea method is one kind of so-called homogeneous precipitation methods, and comparatively uniform and small size particles can be obtained by the method. Also in case of rare earth metal ions, a rare earth metal carbonate, a rare earth metal basic carbonate, or a rare earth metal hydroxide can be precipitated by heating an aqueous solution of a rare earth metal salt with urea (disclosed in, for example, Patent Document 2.

Finer particles are recently required to particles of rare earth compound such as rare earth oxide, and a simple method for preparing such finer particles of rare earth compound is also required. Comparatively uniform particles having sub-micron-size can be easily obtained by the urea method according to the characteristics of the homogeneous precipitation method. Generally, it is easy to obtain particles having sub-micron-size by the urea method, however, it is hard to obtain finer particles having nano-size by the method. Besides, sharp or narrow particle size distribution is required in distribution of such particles because if a large particle included in the particles, such large particle sometimes causes abnormal grain growth or property defect at the position of the large particle in use for ceramics or electric parts although the particles have the same particle size. Thus, particles having a low dispersity index along with a small average particle size, as its characteristics are needed for materials of electric parts or ceramics.

An object of the invention is to provide a facile and simple method for preparing rare earth compound particles having a high dispersibility and a small size, and typically, having a low dispersity index. Further, another object of the invention is to provide rare earth oxide particles suitably prepared by the method, and a slurry containing the rare earth oxide particles.

Making investigations, the inventor has found that: in a method of preparing particles of rare earth compound by a reaction of a hydrolysis product of urea, and the rare earth metal ions to generate a rare earth compound as a precipitate, particles of a rare earth compound are prepared when an acetylene glycol-ethylene oxide adduct is added into an aqueous solution containing rare earth metal ions and urea, and then the aqueous solution is heated; a rare earth oxide is formed by further steps of separating the resulting precipitate from the solution by a solid-liquid separation, and firing the obtained solid component in an atmosphere containing oxygen to form a rare earth oxide. Moreover, the inventor has found that the obtained particles are fine particles of rare earth compound or rare earth oxide having a high dispersibility in a dispersion medium, a small particle size (e.g., a median particle size D50 of up to 50 nm) when dispersed in a slurry, and a low dispersity index reflected in a sharp or narrow particle size distribution. Furthermore, the inventor has found that the method for preparing particles of rare earth compound or rare earth oxide is a quite facile and simple method for preparing such particles.

In one aspect, the invention provides a method for preparing rare earth compound particles, including the step of: heating an aqueous solution containing rare earth metal ions and urea to form a rare earth compound by a reaction of a hydrolysis product of urea, and the rare earth metal ions, wherein in the heating step, heating the aqueous solution into which an acetylene glycol-ethylene oxide adduct is added.

In a preferred embodiment, the method further includes the steps of: separating a precipitate of the rare earth compound generated in the heating step from the solution by a solid-liquid separation, and firing the obtained solid component in an atmosphere containing oxygen to form a rare earth oxide.

Preferably, the rare earth metal ions include ions of at least one rare earth metal selected from the group consisting of Y, Gd, Tb, Dy, Ho, Er, Tm, Yb and Lu.

Preferably, the acetylene glycol-ethylene oxide adduct has the structure represented by the following structural formula:

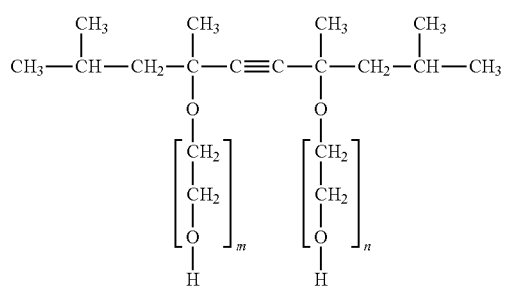

wherein m is 0 or an integer number of 1 to 5, n is 0 or an integer number of 1 to 5, and at least one of m and n is 1 or more.

In another aspect, the invention provides rare earth oxide particles having a volume basis median particle size D50 of up to 50 nm when the particles are dispersed in a disperse medium.

Preferably, the rare earth oxide particles have a dispersity index S of up to 1, the dispersity index S being determined according to the formula (1):

$$(D90-D10)/D50 \qquad (1)$$

wherein D10, D50 and D90 are cumulative 10%, 50% and 90% diameters in volume basis particle size distribution, respectively.

In a further aspect, the invention provides a slurry including a dispersion medium and rare earth oxide particles wherein the particles have a volume basis median particle size D50 of up to 50 nm.

Preferably, the rare earth oxide particles have a dispersity index S of up to 1, the dispersity index S being determined according to the formula (1) defined above.

Advantageous Effects of Invention

According to the invention, fine particles of rare earth compound or rare earth oxide having a high dispersibility in a dispersion medium, a small particle size when dispersed in a slurry, and a low dispersity index in a particle size distribution can be prepared by a facile and simple method.

DESCRIPTION OF PREFERRED EMBODIMENTS

Figure 1:
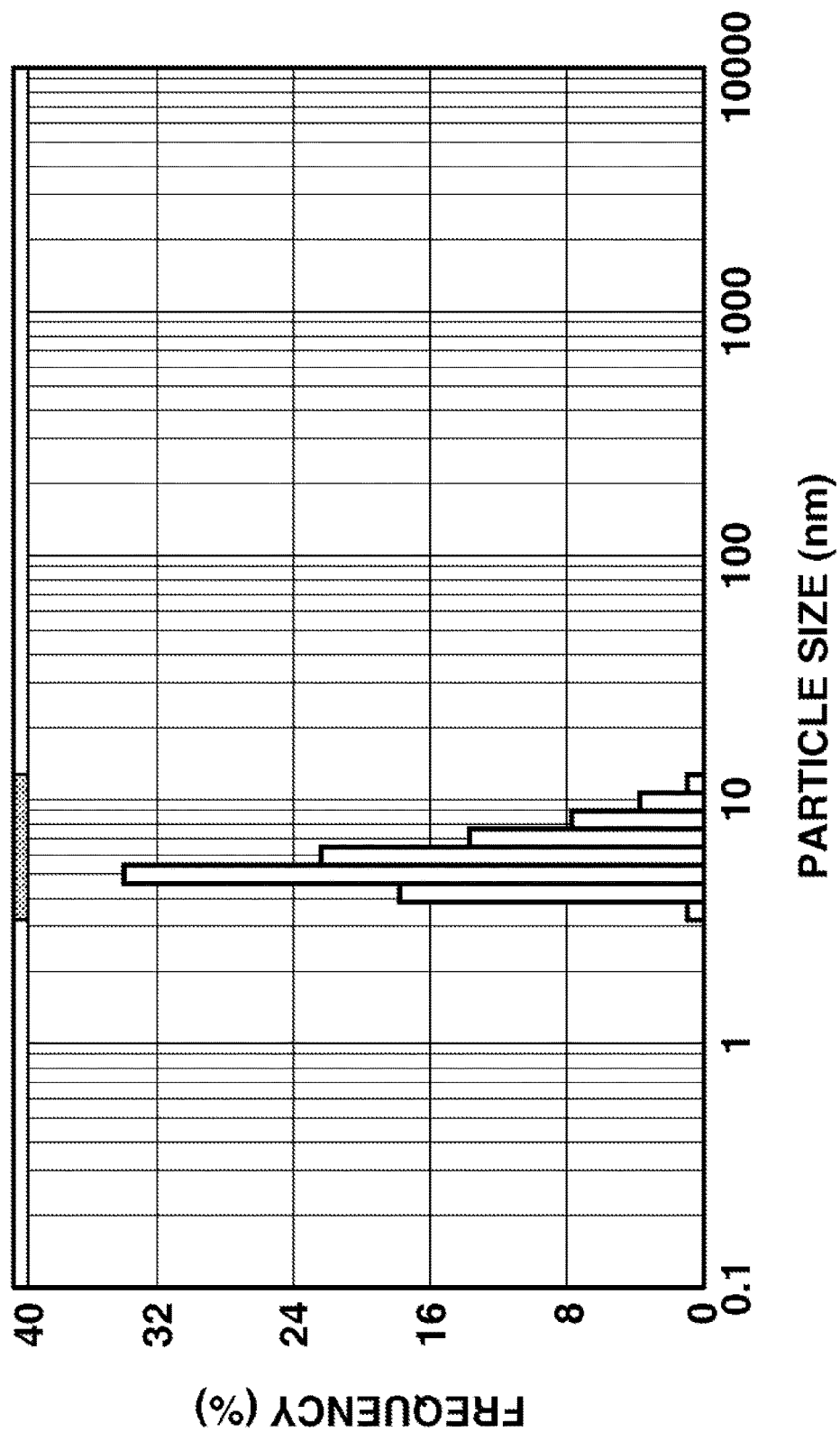
FIG. 1 is a diagram showing a particle size distribution of the yttrium oxide particles obtained in Example 1.

Rare earth compound particles of the present invention are prepared by heating an aqueous solution containing rare earth metal ions and urea to form a rare earth compound by a reaction of a hydrolysis product of urea, and the rare earth metal ions. The aqueous solution containing rare earth metal ions may be prepared as an aqueous solution of a water-soluble salt of rare earth metal. A concentration of the rare earth metal ions in the aqueous solution is preferably at least 0.01 mol/L, more preferably at least 0.02 mol/L, and preferably up to 0.1 mol/L, more preferably up to 0.05 mol/L.

Preferably, the rare earth metal ions include ions of at least one rare earth metal selected from the group consisting of Y, Gd, Tb, Dy, Ho, Er, Tm, Yb and Lu. The water-soluble salt of rare earth metal is exemplified nitrate or chloride that can provide an aqueous solution containing rare earth metal ions.

A part of the rare earth metal ions of at least one rare earth metal selected from the group consisting of Y, Gd, Tb, Dy, Ho, Er, Tm, Yb and Lu may be substituted with another rare earth metal ions other than the nine elements, e.g., rare earth metal ions of at least one rare earth metal selected from the group consisting of La, Ce, Pr, Nd, Sm and Eu, and both of the one and another rare earth metal ions may be used in combination. In this case, a concentration of the whole of the rare earth metal ions in the aqueous solution is preferably at least 0.01 mol/L, more preferably at least 0.02 mol/L, and preferably up to 0.1 mol/L, more preferably up to 0.05 mol/L. The water-soluble salt of rare earth metal such as nitrate and chloride may be used in combination of the one and another rare earth metal ions.

In the aqueous solution containing rare earth metal ions, an acetylene glycol-ethylene oxide adduct is added. The acetylene glycol-ethylene oxide adduct preferably has the structure represented by the following structural formula:

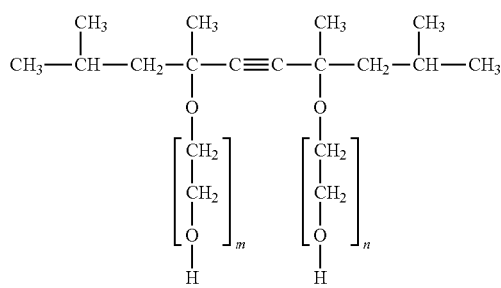

wherein m is 0 or an integer number of 1 to 5, n is 0 or an integer number of 1 to 5, and at least one of m and n is 1 or more. The acetylene glycol-ethylene oxide adduct may be utilized a commercial product.

An additive amount of the acetylene glycol-ethylene oxide adduct in the aqueous solution is preferably at least 0.01 g, particularly at least 0.5 g per 1 L of the aqueous solution containing rare earth metal ions. When a larger amount of the acetylene glycol-ethylene oxide adduct is added to the aqueous solution, particles having a smaller particle size can be obtained. However, when the rare earth compound is collected by a solid-liquid separation, in some cases, long time is needed for the collection of precipitation or to process yield degrades. Thus, practical upper limit of the additive amount of the acetylene glycol-ethylene oxide adduct is up to 5 g, particularly up to 3 g.

The aqueous solution containing rare earth metal ions contains also urea. An amount of urea is preferably at least 5 times, particularly at least 10 times, and preferably up to 30 times, particularly up to 20 times of an amount of rare earth metal ions in molar ratio. If the amount is less than the range, it may be needed too long time to generate the rare earth compound. If the amount exceeds the range, it may be disadvantage in economic efficiency.

Further, any other additional compounds other than the acetylene glycol-ethylene oxide adduct and urea such as hydrogen peroxide and polycarboxylic acid may be added to the aqueous solution containing rare earth metal ions.

A mixing order of each of the components is not limited thereto, however, when rare earth metal ions (rare earth metal salt) and an acetylene glycol-ethylene oxide adduct are firstly mixed, then urea is mixed to them, such mixing order has advantage to form more fine and uniform particles.

In the method of preparing rare earth compound of the present invention, urea is hydrolyzed by heating the aqueous solution containing the components, carbonate ions and ammonium ions generated by hydrolysis of urea is reacted with rare earth metal ions to form a precipitate of a rare earth compound. A heating temperature is preferably at least 70° C., particularly 90° C., and preferably up to a boiling point of the aqueous solution containing the mixture of the components, particularly less than the boiling point, most preferably, for example, up to 100° C. A heating time may be set short in case where an amount of urea is large or a heating temperature is high, however, generally 30 to 200 minutes.

The generated precipitate is formed as a slurry having a low sedimentation property. The precipitate can be separated by a solid-liquid separation such as a filtration, a decantation, a sedimentation separation (e.g., a centrifugal separation), etc. The precipitate is preferably separated by a centrifugal separation for the solid-liquid separation because particles is very small and such particles may pass through a general filter with high possibility. A solid component obtained by a solid-liquid separation may rinsed with e.g., pure water if it is preferable to remove an unreacted urea and residual anions contained in the solid component. Further, the solid component may be dried under an oxygen-containing atmosphere such as air atmosphere and an inert gas atmosphere. The rare earth compound particles obtained by the method includes, for example, a rare earth metal carbonate, a rare earth metal basic carbonate, or a rare earth metal hydroxide corresponding to the contained rare earth metal element.

The rare earth compound particles obtained as a precipitate may be directly used without any treatment, however, may be fired to form a rare earth oxide. If the rare earth compound particles collected as a solid component by a solid-liquid separation is fired without any treatment, in many cases, the solid compound becomes a block by aggregating or sintering. Thus, to collect fine rare earth oxide particles having a good dispersibility after firing, it is preferable to dry rare earth compound particles collected as a solid component and then to fire them. A drying temperature is preferably up to 150° C., more preferably up to 80° C., most preferably 60° C. When the drying temperature is too high, in some kinds of rare earth metals, the rare earth compound recrystallizes and may damage in properties of fine particles. A drying time is preferably at least one day (24 hours), and up to 7 days (168 hours), however, not limited thereto. A drying atmosphere is not limited, however, may be an oxygen-containing atmosphere such an air atmosphere, or an inert gas atmosphere.

The dried rare earth compound is preferably disintegrated by a disintegrating machine. The dried rare earth compound particles can be easily separated to individual particles by loosening with applying a weak force because it is assumed that the dried rare earth compound particles are bonded each other with a weak force of such as a hydrogen bonding. The disintegrating machine is selected from a jet mill, a roll mill, a hammer mill, a bead mill, a ball mill, and so on. The disintegrating machine is selected according to a desired condition of particle after disintegrating.

The firing for preparing a rare earth oxide is preferable conducted under an oxygen-containing atmosphere such as air and oxygen gas and at a temperature of preferably at least 500° C., more preferably at least 550° C., most preferably 600° C., and preferably up to 1,000° C., more preferably 900° C. A firing time is preferably at least 5 minutes, and generally, up to 6 hours.

By the preparing method of the present invention, rare earth compound particles or rare earth oxide particles having a volume basis median particle size D50 of up to 50 nm, particularly up to 20 nm, typically up to 10 nm can be obtained. The volume basis median particle size D50 is a cumulative 50% diameter in volume basis particle size distribution. The particle size distribution and the median particle size can be measured preferably by a dynamic light-scattering method (measured by a dynamic light-scattering particle size analyzer). The method is suitable to measure a particle size of typically 1 to 1,000 nm.

In generally, fine particles tend to become agglomerated particles because a surface energy of the fine particles becomes larger depending to decrease the particle size. If a particle size distribution is measured without proper pretreatment, a particle size distribution of the agglomerated particles which is larger particle size than the actual particle size of fine particle itself is frequently measured. It is important to apply not only a suitable measuring method but also a suitable pretreatment method of a sample for correct evaluation of particles having a particle size of sub-micron size or less. As a pretreatment for rare earth compound particles or rare earth oxide particles of the present invention, it is suitable to prepare a dispersion sample including the particles along with ethanol as a solvent, and a small amount of a dispersing agent (e.g., diglycerin lauric acid ester) by a bead mill. Accordingly, a sample condition without agglomeration is made by the pretreatment, thus, correct evaluation of fine particles is possible.

The method of the present invention can prepare rare earth compound particles or rare earth oxide particles dispersed in a dispersion medium and having a volume basis median particle size D50 of up to 50 nm, particularly up to 20 nm, typically up to 10 nm. Accordingly, a slurry including such rare earth oxide particles and a dispersion medium can be provided.

Further, the method of the present invention can prepare rare earth oxide particles having a dispersity index S of up to 1 when the particles are dispersed in a dispersion medium. This dispersity index S is determined according to the formula (1):

$$(D90-D10)/D50 \qquad (1)$$

wherein D10, D50 and D90 are cumulative 10%, 50% and 90% diameters in volume basis particle size distribution, respectively. Accordingly, a slurry including such rare earth oxide particles and a dispersion medium can be provided. D10, D50 and D90 can be measured preferably by a dynamic light-scattering method (measured by a dynamic light-scattering particle size analyzer).

It is suitable to use a dispersion medium such as water and an organic solvent such as an alcohol. A water-soluble organic solvent, particularly ethanol is preferable as the organic solvent. Rare earth oxide particles are mixed with a dispersion medium to form a slurry. Other than simple mixing, the dispersion is effective formed by common method such as a bead mill.

EXAMPLES

Examples of the invention are given below by way of illustration and not by way of limitation.

Example 1

800 L of pure water was added into a 1,000 L vessel and a yttrium nitrate aqueous solution was added so as to result in a concentration of yttrium ions of 0.05 mol/L, obtaining an about 950 L of aqueous solution. Next, 1,000 g of an acetylene glycol-ethylene oxide adduct represented by the following structural formula:

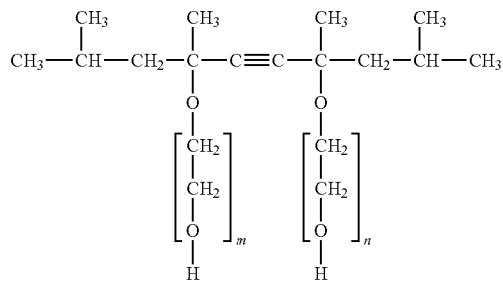

wherein m=1 and n=1, was added into the aqueous solution and mixed, obtaining an aqueous solution. In addition, 15 times moles of urea based on yttrium ions was added into the aqueous solution and mixed, then a mixed aqueous solution was obtained. The obtained aqueous solution was heated to 95° C. and held the temperature for 90 minutes to proceed hydrolysis, then cooled to a room temperature. As a result, a precipitate of a rare earth compound (yttrium compound) containing yttrium basic carbonate as a main component was formed by hydrolysis of urea, and a reaction of a hydrolysis product and yttrium ions. When the heating, the aqueous solution was slowly stirred by a stirring paddle so as to uniform temperature distribution of the aqueous solution in the vessel.

Next, a precipitate was separated from the reaction liquid by a solid-liquid separation using a centrifugal separator. Further, the collected solid component was rinsed with water to remove an unreacted urea and residual nitrate ions contained in the solid component. Next, the obtained rare earth compound particles were dried at 55° C. for 5 days, and the dried aggregate was disintegrated to particulate by a jet mill. Next, the rare earth compound particles disintegrated were fired at 600° C. for 4 hours, obtaining yttrium oxide particles.

10 g of the obtained yttrium oxide particles were mixed with 200 g of ethanol and 5 g of diglycerin lauric acid ester, and dispersed by a bead mill for 2 hours. A particle size distribution of the dispersed yttrium oxide particles was measured. The measurement of a particle size distribution was conducted by a dynamic light-scattering particle size analyzer (Nanotrac Wave II, manufactured by Microtrac-BEL Corp.), applied the same in the following measurements. The results are shown in FIG. 1 and Table 1. The obtained yttrium oxide particles had a median particle size D50 of 5.3 nm, a D90 of 7.8 nm, a D10 of 4.2 nm and a dispersity index S computed according to the above formula (1) of about 0.679. The yttrium oxide particles had a small particle size and a very sharp/narrow particle size distribution.

TABLE 1

| Cumulative percentage (%) | Particle size (μm) |
| --- | --- |
| 10.00 | 0.0042 |
| 20.00 | 0.0046 |
| 30.00 | 0.0048 |
| 40.00 | 0.0050 |
| 50.00 | 0.0053 |

TABLE 1-continued

| Cumulative percentage (%) | Particle size (μm) |
| --- | --- |
| 60.00 | 0.0056 |
| 70.00 | 0.0061 |
| 80.00 | 0.0068 |
| 90.00 | 0.0078 |
| 95.00 | 0.0088 |

Example 2

800 L of pure water was added into a 1,000 L vessel and a holmium nitrate aqueous solution was added so as to result in a concentration of holmium ions of 0.05 mol/L, obtaining an about 950 L of aqueous solution. Next, 3,000 g of an acetylene glycol-ethylene oxide adduct used in Example 1, was added into the aqueous solution and mixed, obtaining an aqueous solution. In addition, 15 times moles of urea based on holmium ions was added into the aqueous solution and mixed, then a mixed aqueous solution was obtained. The obtained aqueous solution was heated to 95° C. and held the temperature for 4 hours to proceed hydrolysis, then cooled to a room temperature. As a result, a precipitate of a rare earth compound (holmium compound) containing holmium basic carbonate as a main component was formed by hydrolysis of urea, and a reaction of a hydrolysis product and holmium ions. When the heating, the aqueous solution was slowly stirred by a stirring paddle so as to uniform temperature distribution of the aqueous solution in the vessel.

Next, a precipitate was separated from the reaction liquid by a solid-liquid separation using a centrifugal separator. Further, the collected solid component was rinsed with water to remove an unreacted urea and residual nitrate ions contained in the solid component. Next, the obtained rare earth compound particles were dried at 55° C. for 5 days, and the dried aggregate was disintegrated to particulate by a jet mill. Next, the rare earth compound particles disintegrated were fired at 600° C. for 4 hours, obtaining holmium oxide particles.

Figure 2:
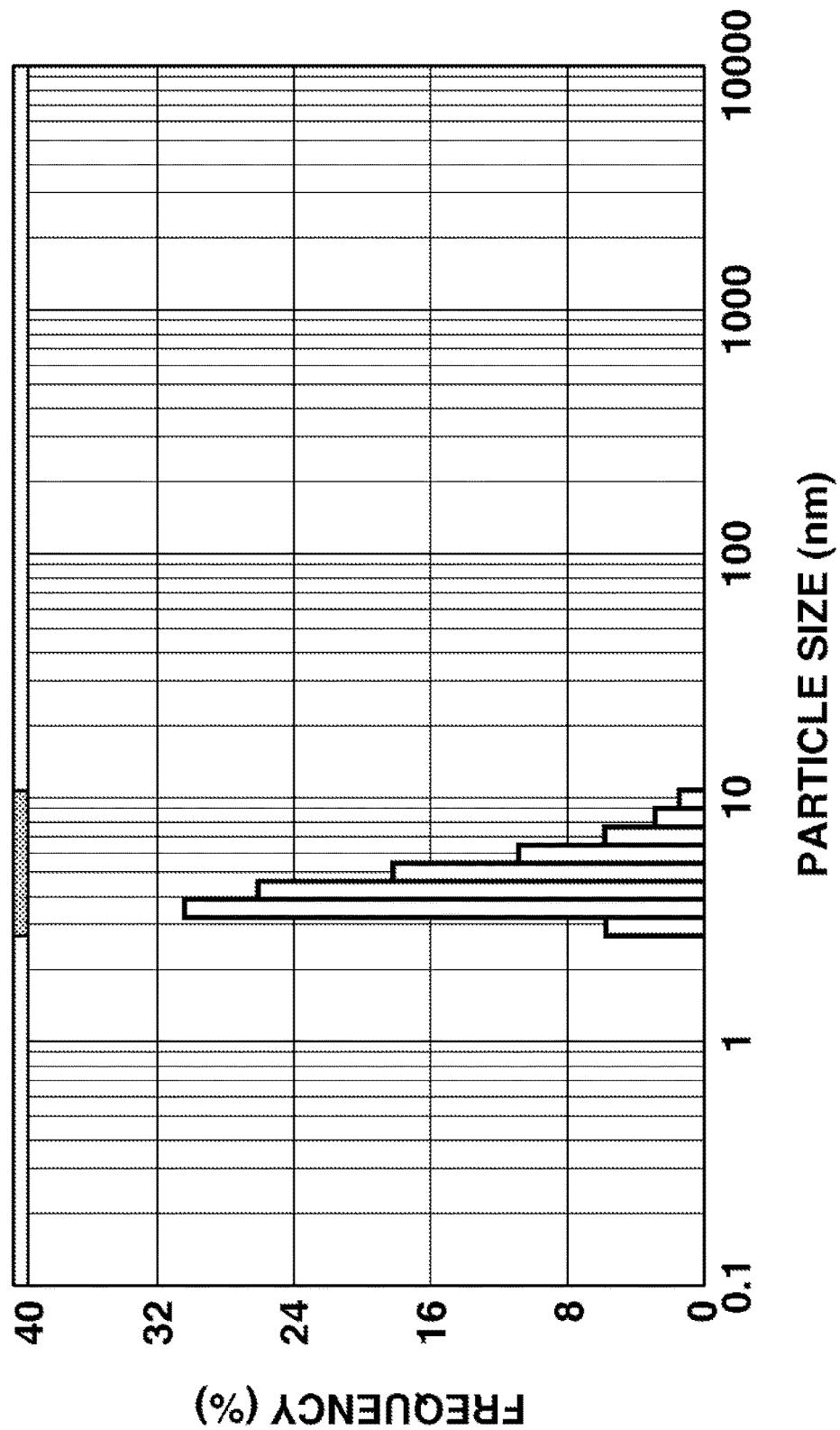
FIG. 2 is a diagram showing a particle size distribution of the holmium oxide particles obtained in Example 2.

10 g of the obtained holmium oxide particles were mixed with 200 g of ethanol and 5 g of diglycerin lauric acid ester, and dispersed by a bead mill for 2 hours. A particle size distribution of the dispersed holmium oxide particles was measured. The results are shown in FIG. 2 and Table 2. The obtained yttrium oxide particles had a median particle size D50 of 4.1 nm, a D90 of 6.3 nm, a D10 of 3.3 nm and a dispersity index S computed according to the above formula (1) of about 0.732. The yttrium oxide particles had a small particle size and a very sharp/narrow particle size distribution.

TABLE 2

| Cumulative percentage (%) | Particle size (μm) |
| --- | --- |
| 10.00 | 0.0033 |
| 20.00 | 0.0035 |
| 30.00 | 0.0037 |
| 40.00 | 0.0039 |
| 50.00 | 0.0041 |
| 60.00 | 0.0045 |
| 70.00 | 0.0048 |
| 80.00 | 0.0054 |
| 90.00 | 0.0063 |
| 95.00 | 0.0072 |

Comparative Example 1

800 L of pure water was added into a 1,000 L vessel and a yttrium nitrate aqueous solution was added so as to result in a concentration of yttrium ions of 0.05 mol/L, obtaining an about 950 L of aqueous solution. Next, 100 g of 36% hydrogen peroxide aqueous solution was added into the aqueous solution and mixed, obtaining an aqueous solution. In addition, 15 times moles of urea based on yttrium ions was added into the aqueous solution and mixed, then a mixed aqueous solution was obtained. The obtained aqueous solution was heated to 95° C. and held the temperature for 4 hours to proceed hydrolysis, then cooled to a room temperature. As a result, a precipitate of a rare earth compound (yttrium compound) containing yttrium basic carbonate as a main component was formed by hydrolysis of urea, and a reaction of a hydrolysis product and yttrium ions. When the heating, the aqueous solution was slowly stirred by a stirring paddle so as to uniform temperature distribution of the aqueous solution in the vessel.

Next, a precipitate was separated from the reaction liquid by a solid-liquid separation using a centrifugal separator. Further, the collected solid component was rinsed with water to remove an unreacted urea and residual nitrate ions contained in the solid component. Next, the obtained rare earth compound particles were dried at 55° C. for 5 days, and the dried aggregate was disintegrated to particulate by a jet mill. Next, the rare earth compound particles disintegrated were fired at 600° C. for 4 hours, obtaining yttrium oxide particles.

Figure 3:
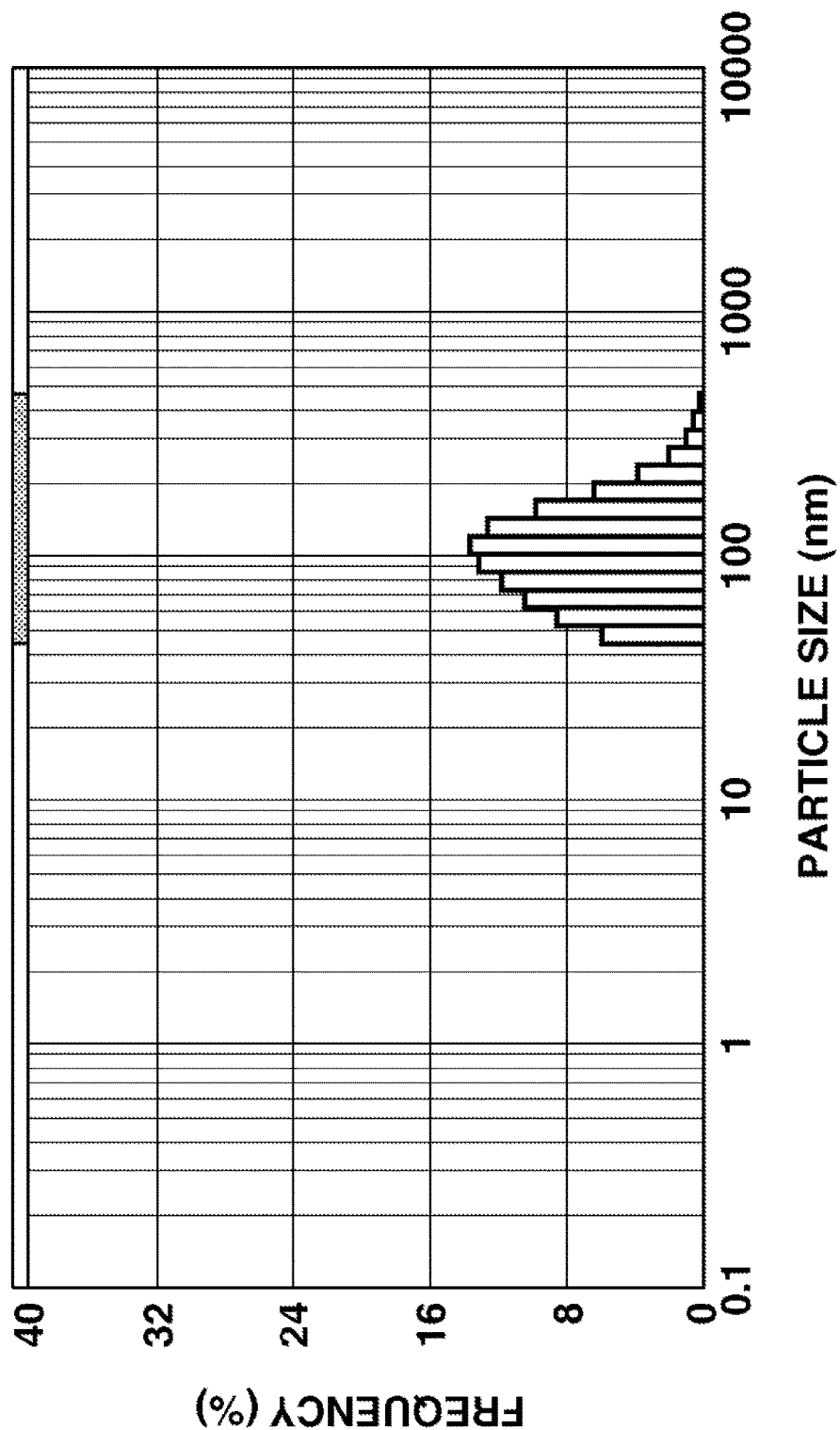
FIG. 3 is a diagram showing a particle size distribution of the yttrium oxide particles obtained in Comparative Example 1.

10 g of the obtained yttrium oxide particles were mixed with 200 g of ethanol and 5 g of diglycerin lauric acid ester, and dispersed by a bead mill for 2 hours. A particle size distribution of the dispersed yttrium oxide particles was measured. The results are shown in FIG. 3 and Table 3. The obtained yttrium oxide particles had a median particle size D50 of 102.5 nm, a D90 of 189 nm, a D10 of 55.8 nm and a dispersity index S computed according to the above formula (1) of about 1.30. The yttrium oxide particles had a large particle size compared with that in Example 1 and a broad particle size distribution.

TABLE 3

| Cumulative percentage (%) | Particle size (µm) |
|---|---|
| 10.00 | 0.0558 |
| 20.00 | 0.0669 |
| 30.00 | 0.0781 |
| 40.00 | 0.0898 |
| 50.00 | 0.1025 |
| 60.00 | 0.1163 |
| 70.00 | 0.1324 |
| 80.00 | 0.1538 |
| 90.00 | 0.1896 |
| 95.00 | 0.2268 |

Japanese Patent Application No. 2018-162406 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A slurry comprising a dispersion medium and rare earth oxide particles wherein the particles have a volume basis median particle size D50 of up to 50 nm, and the rare earth oxide particles have a dispersity index S of up to 1, the dispersity index S being determined according to the formula (1):

$$(D90-D10)/D50 \qquad (1)$$

wherein D10, D50 and D90 are cumulative 10%, 50% and 90% diameters in volume basis particle size distribution, respectively.

2. The slurry of claim 1 wherein the rare earth oxide particles have a volume basis median particle size D50 of up to 20 nm.

3. The slurry of claim 1 wherein the rare earth oxide particles have a volume basis median particle size D50 of up to 10 nm.

4. A slurry comprising a dispersion medium and rare earth oxide particles wherein the particles have a volume basis median particle size D50 of up to 50 nm, and the rare earth comprises at least one selected from the group consisting of Y, Gd, Tb, Dy, Ho, Er, Tm, Yb and Lu.

5. The slurry of claim 4 wherein the rare earth further comprises at least one selected from the group consisting of La, Ce, Pr, Nd, Sm and Eu.

6. The slurry of claim 4 wherein the rare earth oxide particles have a dispersity index S of up to 1, the dispersity index S being determined according to the formula (1):

$$(D90-D10)/D50 \qquad (1)$$

wherein D10, D50 and D90 are cumulative 10%, 50% and 90% diameters in volume basis particle size distribution, respectively.

7. The slurry of claim 4 wherein the rare earth oxide particles have a volume basis median particle size D50 of up to 20 nm.

8. The slurry of claim 4 wherein the rare earth oxide particles have a volume basis median particle size D50 of up to 10 nm.

9. A slurry comprising a dispersion medium and rare earth oxide particles wherein the particles have a volume basis median particle size D50 of up to 50 nm, and the rare earth oxide particles are prepared by the steps of:

heating an aqueous solution containing rare earth metal ions and urea to form rare earth compound particles by reaction of a hydrolysis product of urea, and the rare earth metal ions, separating a precipitate of the rare earth compound particles generated in the heating step from the solution by a solid-liquid separation, firing the obtained solid component in an atmosphere containing oxygen to form a rare earth oxide, wherein in the heating step, heating the aqueous solution into which an acetylene glycol-ethylene oxide adduct is added, and wherein the rare earth comprise at least one selected from the group consisting of Y, Gd, Tb, Dy, Ho, Er, Tm, Yb and Lu.

10. The slurry of claim 9 wherein rare earth further comprises at least one selected from the group consisting of La, Ce, Pr, Nd, Sm and Eu.

11. The slurry of claim 9 wherein the acetylene glycol-ethylene oxide adduct has the structure represented by the following structural formula:

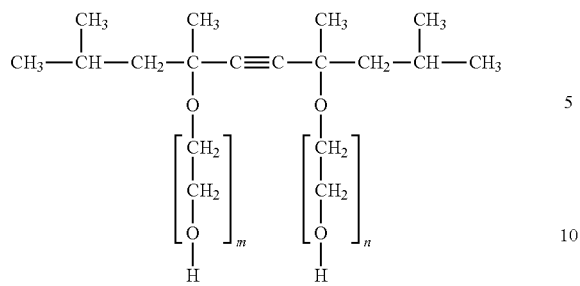

wherein m is 0 or an integer number of 1 to 5, n is 0 or an integer number of 1 to 5, and at least one of m and n is 1 or more.

12. The slurry of claim 9 wherein the rare earth oxide particles have a dispersity index S of up to 1, the dispersity index S being determined according to the formula (1):

$$(D90-D10)/D50 \qquad (1)$$

wherein D10, D50 and D90 are cumulative 10%, 50% and 90% diameters in volume basis particle size distribution, respectively.

13. The slurry of claim 9 wherein the rare earth oxide particles have a volume basis median particle size D50 of up to 20 nm.

14. The slurry of claim 9 wherein the rare earth oxide particles have a volume basis median particle size D50 of up to 10 nm.

* * * * *